United States Patent

[11] 3,625,357

[72] Inventors Charles S. Ochs;
Charles W. Probasco, both of Lancaster, Ohio
[21] Appl. No. 34,450
[22] Filed May 4, 1970
[45] Patented Dec. 7, 1971
[73] Assignee Anchor Hocking Corporation
Lancaster, Ohio

[54] DAMAGED CAP EJECTOR
12 Claims, 6 Drawing Figs.

[52] U.S. Cl. ..................................... 209/74, 209/80, 209/90
[51] Int. Cl. ..................................... B07c 3/02
[50] Field of Search ..................................... 209/74, 80, 88, 90; 198/21; 33/174 P

[56] References Cited
UNITED STATES PATENTS
| | | | |
|---|---|---|---|
| 2,742,993 | 4/1956 | Hommel | 209/88 UX |
| 3,310,142 | 3/1967 | Hausen | 209/80 X |

Primary Examiner—Richard A. Schacher
Attorney—Norman N. Holland

ABSTRACT: A bent cap ejector for a closure cap feed chute. A cap gauge captures and holds improperly shaped or bent caps as they pass along the chute. Sensing devices detect the resulting stoppage of cap flow and the gauge with the bent cap therein is moved clear of the chute. An ejector located outside of the chute then punches the improperly shaped cap from the gauge and the gauge is then moved back into the chute. A stop is automatically operated by the gauge movement to stop the flow of caps along the chute when the gauge is moved clear of the chute. The reinsertion of the gauge into the chute disengages the stop member from the chute thereby reinstating flow of the caps.

DAMAGED CAP EJECTOR

BACKGROUND OF THE INVENTION

This invention relates to the handling of closure caps or similar articles and is particularly concerned with improvements in apparatus for automatically detecting and removing improperly formed closure caps from a line of moving caps in a cap feed chute.

Several prior and differing devices for accomplishing this general operation are known as described, for example, in prior patents including the F. H. Lucas et al., U.S. Pat. No. 2,471,489 issued on May 31, 1949, which shows a chute trap door for a gravity removal of bent articles; and the W. B. Hommel et al., U.S. Pat. No. 2,742,993 issued on Apr. 24, 1956, which shows an article gauge with an alarm for a manual removal of bent articles from a conveyor.

The cap ejector of the present invention provides a rapid and automatic means whereby damaged or improperly formed closure caps are removed from a cap feed chute with a positive chute clearing action. It is imperative that such defective closures be removed prior to the capping operation in automatic container-sealing operations. Failure to remove them prevents the proper sealing of containers at the sealing station and may also lead to jamming of the cap-sealing machinery. The use of a cap ejector which automatically senses the presence of a defective cap and which rapidly and positively removes the cap from the chute is especially essential in today's high speed and highly automated capping operations.

SUMMARY OF THE INVENTION

The improved cap ejector of the present invention includes a gauge in the cap chute for blocking or capturing improperly or bent caps. When a cap is captured in the gauge, the gauge is moved outwardly of the chute and is presented to a gauge clearing device. This device includes a piston which engages and pushes the defective cap out of the gauge. While the gauge is being cleared, an automatic stop member engages the line of caps above the chute to cut off cap flow during the gauge-clearing operation.

Accordingly, an object of the invention is to provide improved automatic bent cap detector and ejector for a cap-feeding chute which includes positive means for detecting and removing the bent caps from the chute.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings, forming a part of the specification, wherein:

FIGS. 5 and 6 are horizontal sectional views of the cap ejector in its cap-ejecting position taken along lines 5—5 and 6—6 of FIG. 3.

DESCRIPTION OF THE PREFERRED EMBODIMENT

Figure 1:
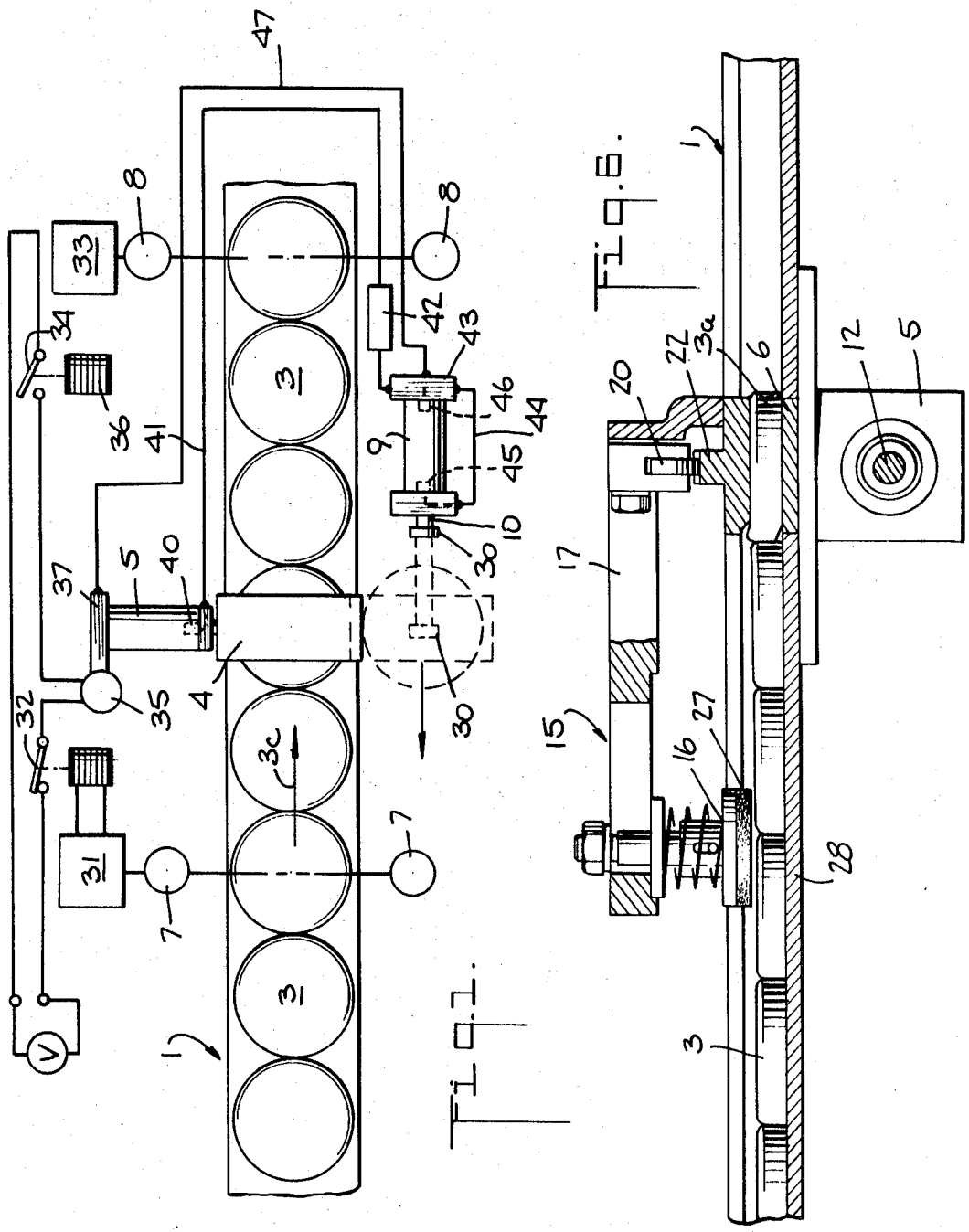
FIG. 1 is a diagrammatic plan view of a preferred embodiment of the bent cap ejector in accordance with the present invention.

The operation of the invention will first be generally described with particular reference to FIG. 1. A cap feed chute 1 containing a moving line of closures 3 provides cap feed in the direction indicated by the arrow 3c for a sealing machine (not shown). The chute 1 includes a cap gauge 4 which is proportioned to pass acceptably shaped caps and to capture or block the passage of bent caps. The cap gauge 4 is movably mounted on chute 1 and is connected to a drive means such as an air motor 5 for moving it clear of the chute 1 after it has captured and retains a defectively formed closure.

When a moving line of closures 3 contains a bent cap, the bent cap becomes blocked in the gauge 4 and cannot pass through it.

A sensor means 7 continues to detect closures above the gauge 4, however, the portion of the chute 1 below the gauge 4 in the area sensed by sensor means 8 will empty. Sensor means 8 now senses an absence of closures 3 and this combination, as will be more fully described below, causes air motor 5 to move gauge 4 out of the chute 1 and into the position immediately adjacent a cap-removal piston 10 as shown in dash-dot lines. Air motor 9 now extends the piston 10 to punch the damaged closure from the gauge 4. After the gauge is cleared, the gauge 4 is moved back into the chute 1 by the motor 5 and the cap-feeding operation continues.

Figure 2:
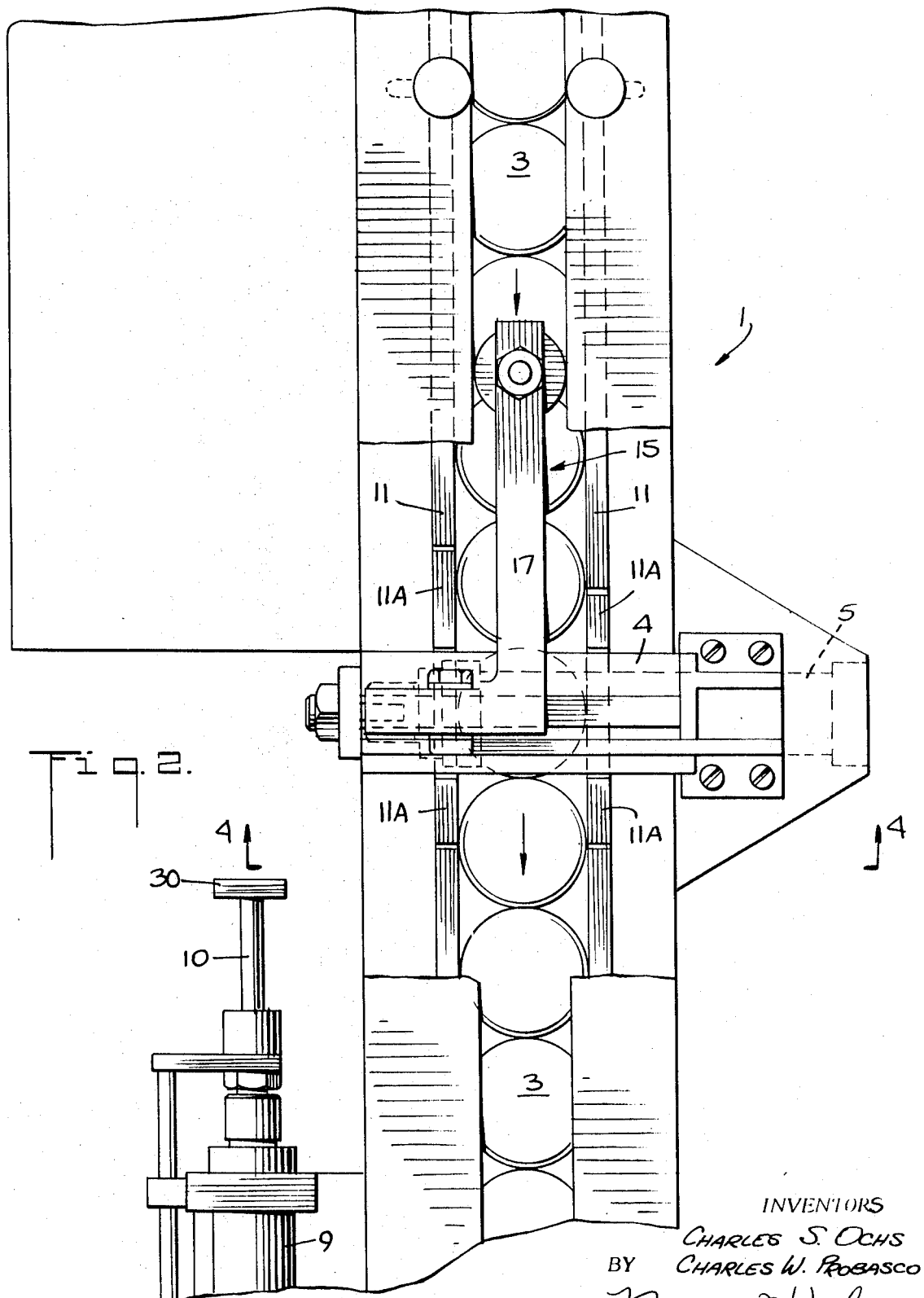
FIG. 2 is a top plan view of the cap ejector showing a line of acceptable caps passing through the ejector.
Figure 3:
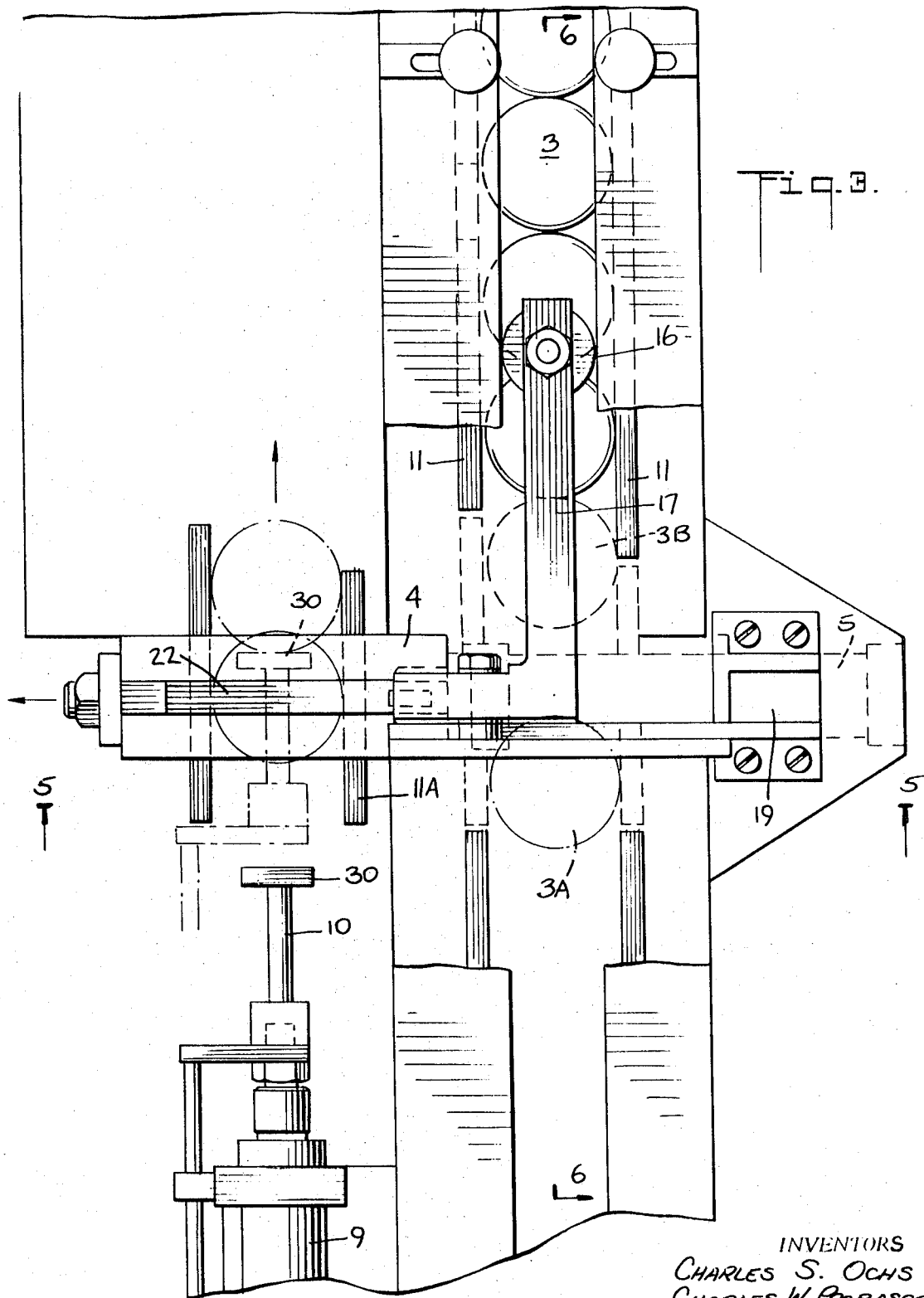
FIG. 3 is a top plan view corresponding to FIG. 2 illustrating a bent cap being removed by the cap ejector from the cap chute.

FIGS. 2–6 show in greater detail a preferred embodiment of the cap ejector. As seen in FIG. 2, a moving line of caps or closures 3 is normally fed through feed chute 1 between guide rails 11 and through cap gauge 4. Properly shaped caps 3 will readily pass through the gauge 4. An improperly formed or bent closure 3a, as shown in FIGS. 3 and 6, will stick in the gauge 4 due to its altered shape. When this occurs, the caps 3 which are being fed towards the gauge 4 and which lie above the gauge 4 will be held up and will not move due to the blockage arising from the blocked cap 3a.

Figure 4:
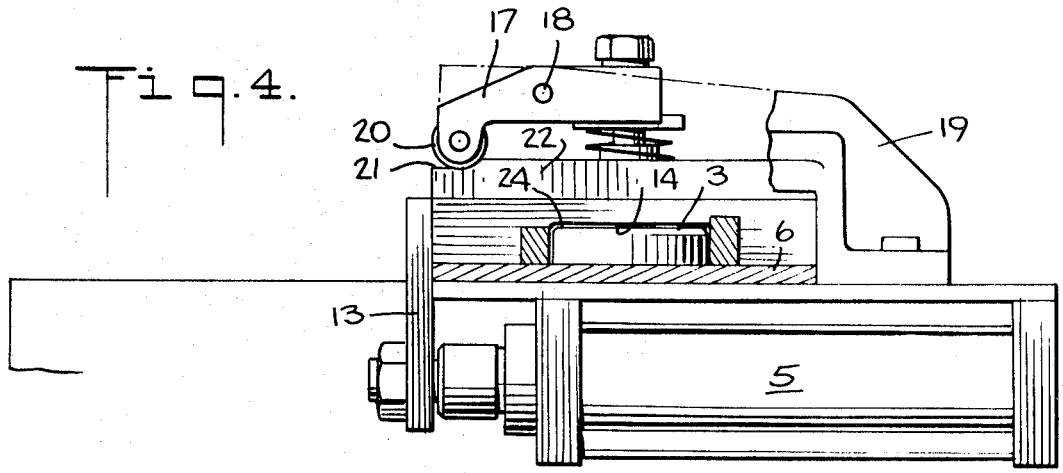
FIG. 4 is a horizontal sectional view of the cap ejector taken along lines 4—4 of FIG. 2.
Figure 5:
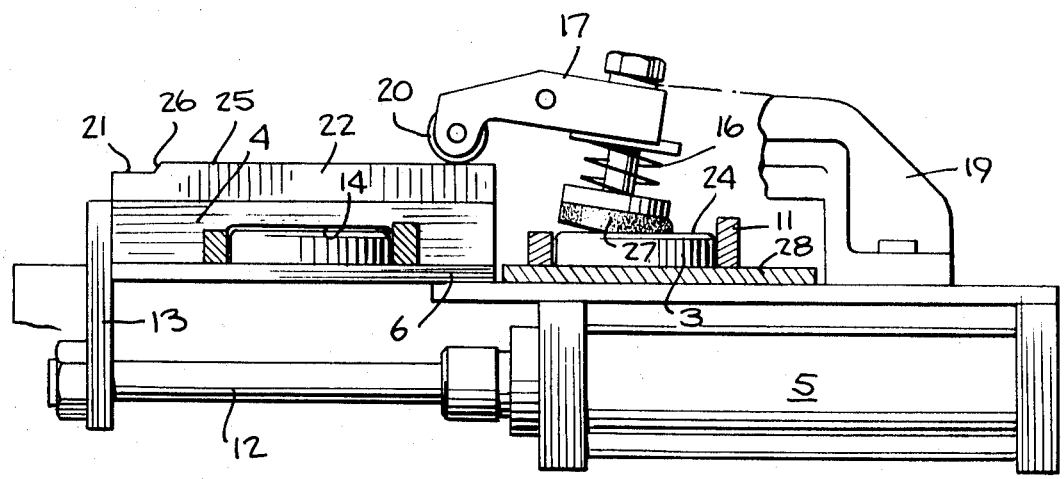

Properly formed closures 3, which have already passed through the cap gauge means 4, will continue to travel away from the gauge 4 so that the portion of the cap feed chute 1 beyond the gauge 4 will become empty as is also shown in FIGS. 3 and 6. Sensor means 7 will detect the line of caps 3 above the gauge 4, and sensor means 8 will detect an absence of caps 3 below the gauge 4. As will be described below, this condition actuates the air motor 5 which, as seen in FIGS. 4 and 5, has a piston rod 12 coupled by a bracket 13 to the cap gauge 4. The gauge 4 includes a gauging opening 14 corresponding to a properly formed cap 3.

The cap gauge 4 including a floor portion 6 slides from the chute 1 in a direction transverse to the line of movement of the caps 3 in the chute 1 and generally in the plane of the chute 1. A stop means 15 is provided whereby the line of closure caps 3 above the gauge 4 are prevented from moving until the cleared gauge 4 has returned to the chute 1. A preferred embodiment of this means comprises a stop member 16 resiliently mounted on an L-shaped support arm 17. The arm 17 is pivotally attached at 18 to a gauge mounting bracket 19. As shown in FIG. 4, a roller 20 on an arm 17 rests on cam surface 21 of cam 22 positioned on gauge 4 when the cap gauge 4 is in the chute 1. When the cam 22 is in this position, stop member 16 is held spaced from the top panels 24 of the moving line of closures 3 in the chute 1.

When air motor 5 is actuated and moves the cap gauge 4 out of the feed chute 1, the roller 20 will ride onto cam surface 25 which is higher than surface 21 and which is connected thereto by a sloped portion 26. Connector arm 17 is pivoted by raised cam roller 20 causing a portion of the pad 27 of stop member 16 to engage a top panel 24 of a closure 3 above the cap gauge 4. The pressure of pad 27 holds the contacted closure or closures against the floor 28 of the cap chute 1 and will prevent the closures 3 from moving through the portion of the chute normally occupied by the cap gauge 4.

The particular position at which a cap will become captured or blocked in gauge 4 will depend upon the area of the cap which has been bent or otherwise damaged. The lowermost closure 3A in FIG. 3 illustrates about the most advanced position at which a closure will be captured by the gauge 4. In this case, there may be an additional closure above the captured closure in the position indicated at 3B and which is not engaged by the stop means 16. This additional closure 3B will also be removed from the chute by the movement of the short rail portions 11A which are attached to and which move the gauge 4. If the damaged closure which is blocked by the gauge 4 is near the uppermost position as represented by the closure 3B, it will be seen that this closure is readily removed from the chute by the combined movement of the gauge 4 and the rail portions 11A and without interference with the lowermost closure engaged by the stop means 16.

After the motor 5 has moved the gauge out of the chute 1 the blocked closure cap will be positioned adjacent the removal head 30 on piston 10. The air motor 9 is then activated and extends piston head 30 to the position shown in dash-dot lines in FIG. 3. The head 30 punches the damaged cap 3a out of the cap gauge 4 and then retracts to the normal rest position shown in solid lines. After a time lag the cap gauge 4 is retracted by air motor 5 to its rest position as shown in FIGS. 2 and 4. Retraction from the position shown in FIG. 5 to that shown in FIG. 4 causes roller 20 to return to its original rest position on cam surface 21 thereby lifting pressure pad 27 and disengaging the closure caps 3 above the cap gauge 4 for movement through the gauge 4.

A preferred automatic control system is illustrated on FIG. 1. During normal operation when closure caps 3 are passing freely through the cap gauge 4 both the sensor means 7 and the sensor means 8 will remain activated by the presence of the moving caps 3. In this condition, the sensing means 7 control means 31 coupled to sensing means 7 will keep relay contacts 32 closed. The control means 33 for the sensing means 8 will keep the relay contacts 34 open. In this condition, no voltage will be passed through the control solenoid 35 for the air motor 5 and it will remain retracted.

When a closure is blocked in gauge 4, the sensing means 8 will detect the absence of closures beyond the gauge 4 and will close the contacts 34 of the associated control relay 36 thereby placing voltage on the motor 5 control solenoid 35 moving the control valve 37 and activating the air motor 5 to move the gauge 4 out of the cap chute 1.

When the piston 12 for the air motor 5 reaches its fully extended position, it engages an internal puff valve 40 in the air motor 5 sending a puff of control air through the air line 41 and through an impulse relay 42 to the control valve 43 of air motor 9. This moves the air motor 9 control valve 43 activating air motor 9 so that its piston 10 is extended to clear the damaged cap from the extended gauge 4.

When the piston 10 for the air motor 9 reaches its fully extended position, it strikes an internal puff valve 45 coupled by line 44 to the air motor 9 control valve 43 thereby causing the air motor 9 to retract. When the air motor 9 reaches its fully retracted position, its piston engages an additional internal puff valve 46 which sends a puff of control air on the air line 47 to the control valve 37 of air motor 5 whereby this valve is operated to retract the air motor 5 piston 12 thereby returning the gauge 4 to its normal position across chute 1. The control solenoid 35 for air motor 5 is a delayed action device so that the resumption of the cap movement through the chute 1 occurs to open the relay contact 34 before another cap-ejection cycle can be initiated at air motor 5.

It can be seen that the present invention provides an improved automatic and high speed cap ejector which may be used to remove improperly formed closures from a cap feed chute with a positive chute-clearing action.

As various changes may be made in the form, construction and arrangement of the parts herein without departing from the spirit and scope of the invention and without sacrificing any of its advantages, it is to be understood that all matter in the foregoing specification is to be interpreted as illustrative and not in a limiting sense.

Having thus described our invention, we claim:

1. A cap ejector comprising chute means in which closure caps travel, cap gauge means in said chute for passing properly formed caps and for capturing and holding improperly formed caps, means for moving the cap gauge means out of the chute, means for removing the improperly formed caps from the gauge, and means for returning the gauge to the chute after the removal of the improperly formed cap from the gauge.

2. A cap ejector as claimed in claim 1 in which said means for moving said cap gauge comprises an air motor.

3. A cap ejector as claimed in claim 1 in which the means for removing an improperly formed cap from the cap gauge is an air motor.

4. A cap ejector as claimed in claim 1 in which the cap gauge comprises an aperture having a cross section similar to that of a properly formed cap.

5. A cap ejector as claimed in claim 1 in which the means for removing the improperly formed cap from the gauge is activated responsive to operation of the means for moving the gauge out of the chute.

6. A cap ejector as claimed in claim 1 in which the means for moving the gauge and the means for removing the improperly formed cap from the gauge comprise air motors.

7. A mechanism as claimed in claim 1 in which sensor means are positioned adjacent said chute such that one sensor means detects caps above said gauge means and another sensor detects an absence of caps below said gauge means.

8. A mechanism as claimed in claim 1 in which movement of the cap gauge out of the chute actuates means for stopping movement of those caps in the chute above said gauge.

9. A mechanism as claimed in claim 8 in which said means for stopping movement comprises a cam-operated arm positioned for contacting a cap in the chute and said cam being coupled to the cap gauge means.

10. A cap ejector comprising a chute means in which closure caps travel, cap gauge means in said chute for capturing and holding only improperly formed caps, means to move said cap gauge means transversely out of the chute generally in the plane of motion of said caps, a cam coupled to said cap gauge means, a movably mounted arm having a stop member for contacting a cap in the chute, cam follower means on said arm engaging said cam to move said stop when said gauge is moved out of the chute to thereby prevent movement of caps in the chute above the gauge, means for removing the improperly formed caps from the gauge, and means to move the gauge back into the chute.

11. A cap ejector as claimed in claim 10 in which the means for moving the gauge and the means for removing the cap are air motors.

12. A cap ejector as claimed in claim 10 which further comprises sensor means adjacent said chute above and below said gauge which activate the gauge moving means when the sensor above the gauge detects caps and the sensor below the gauge detects an absence of caps.

* * * * *